S. H. CAMPBELL.
JOURNAL BEARING FOR RAILWAY CARS.
APPLICATION FILED MAY 20, 1912.

1,056,256.

Patented Mar. 18, 1913.
2 SHEETS—SHEET 1.

WITNESSES:
Chas. A. Becker,
W. A. Alexander.

INVENTOR:
S. H. Campbell,
BY E. E. Hoffman
ATTORNEY.

S. H. CAMPBELL.
JOURNAL BEARING FOR RAILWAY CARS.
APPLICATION FILED MAY 20, 1912.
1,056,256.
Patented Mar. 18, 1913.
2 SHEETS—SHEET 2.
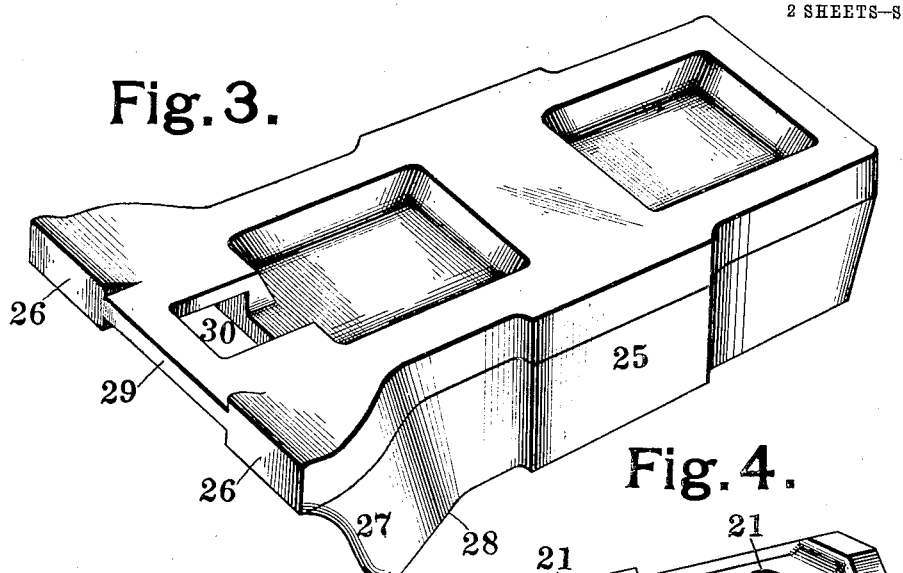
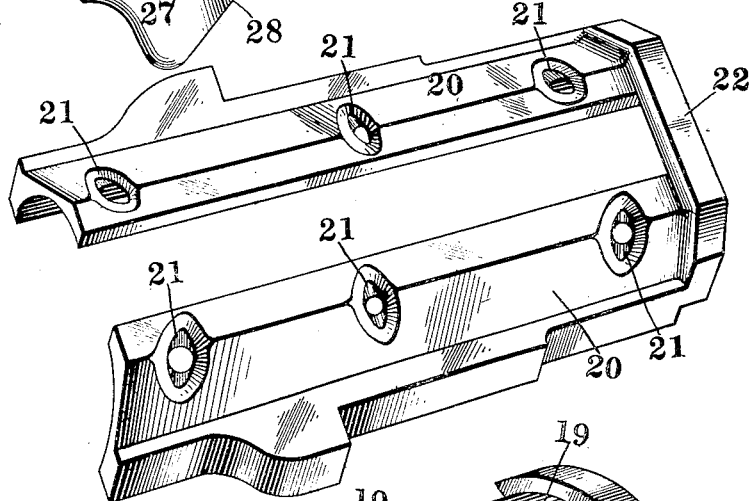
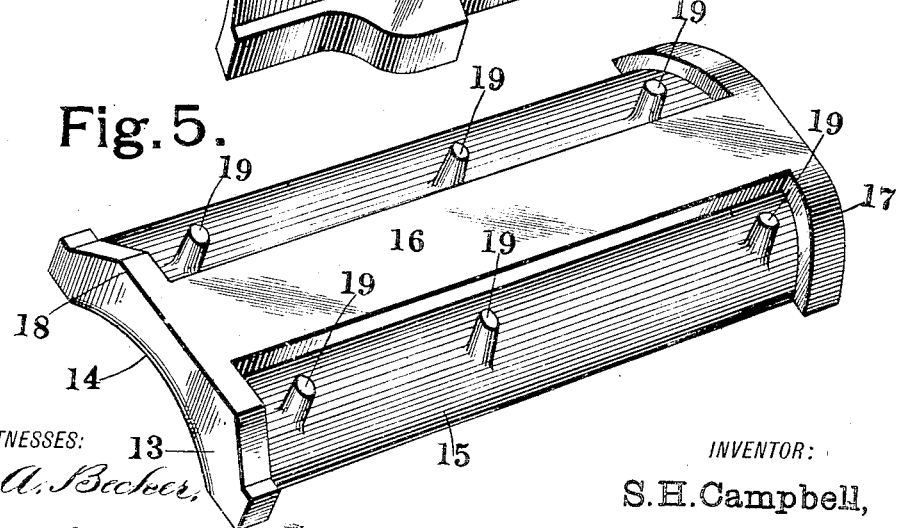
WITNESSES:
Chas. A. Becker,
W. A. Alexander
INVENTOR:
S. H. Campbell,
BY
E. E. Huffman
ATTORNEY

UNITED STATES PATENT OFFICE.

STERLING H. CAMPBELL, OF ST. LOUIS, MISSOURI.

JOURNAL-BEARING FOR RAILWAY-CARS.

1,056,256.  Specification of Letters Patent.  Patented Mar. 18, 1913.

Application filed May 20, 1912. Serial No. 698,439.

*To all whom it may concern:*

Be it known that I, STERLING H. CAMPBELL, a citizen of the United States of America, residing at St. Louis, Missouri, have invented a certain new and useful Journal-Bearing for Railway-Cars, of which the following is such a full, clear, and exact description as will enable any one skilled in the art to which it appertains to make and use the same, reference being had to the accompanying drawings, forming part of this specification.

My invention relates to a journal bearing for railway cars.

One of the objects of my invention is to provide a bearing of the class above referred to in which the greatest possible amount of wear will be secured in proportion to the amount of bearing metal used.

Another object of my invention is to provide a bearing in which a bearing surface of bearing metal will be secured not only between the bearing block and the axle but, also, between the bearing block and the wedge.

Another object of my invention is to provide a bearing in which both the bearing block and the wedge are interchangeable with the similar parts of the standard M. C. B. type of bearing.

Figure 1:
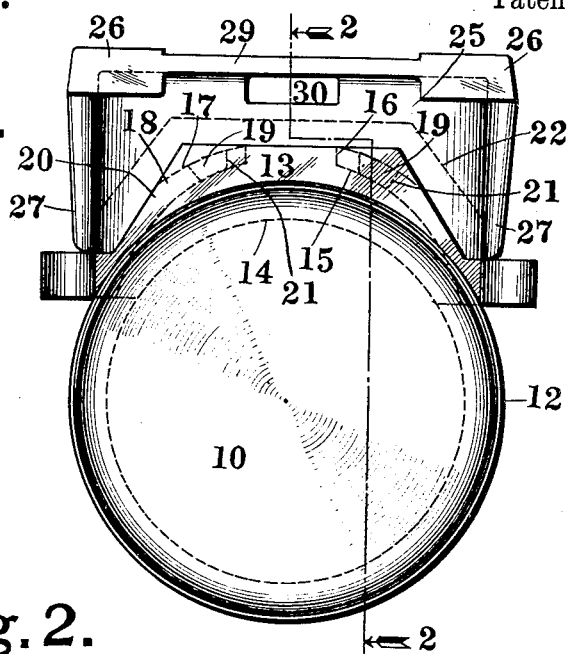
Figure 2:
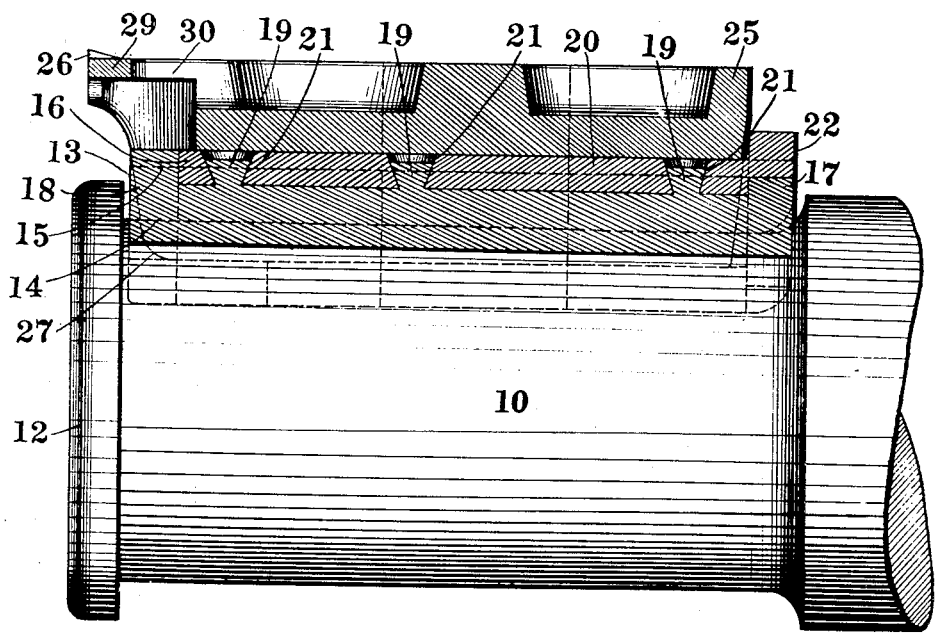

In the accompanying drawings, which illustrate one form of bearing made in accordance with my invention, Figure 1 is an end view showing the bearing applied to the axle of a railway car; Fig. 2 is a section taken on the line 2—2 of Fig. 1; Fig. 3 is a perspective view of the wedge; Fig. 4 is a perspective view of the backing member, and Fig. 5 is a perspective view of the bearing block.

Like marks of reference refer to similar parts in the several views of the drawings.

10 represents the axle of a railway car. This axle 10 is provided at its outer end with the usual flange 12.

13 is a bearing block. This bearing block 13 is provided with an under curved face 14 adapted to conform to the axle 10. The upper face 15 is also curved and the radius of this curvature is the same as that of the lower face 14, so that the bearing will wear evenly throughout and thus the greatest possible amount of wear will be secured for the amount of bearing metal used in the bearing block 13. In order that the bearing block may furnish the surface of bearing metal between itself and the wedge, the center of the upper face 15 is provided with a longitudinal rib 16 extending the entire length of the block. The upper surface is also provided with a rear flange 17, a front flange 18, and a number of projections 19, the object of which will hereinafter be explained.

In order to strengthen the bearing block 13 and at the same time to cause its upper surface to conform to the lower face of the wedge without the use of unnecessary bearing metal, I provide a pair of backing strips 20 which fit into the recesses between the rear and front flanges 17 and 18 at each side of the central bearing surface 16. These bearing strips 20 are provided with tapered openings 21 adapted to receive the projections 19 on the upper face of the bearing block 13. These projections 19, after entering the openings 21, are riveted, as best shown in Fig. 2, so as to secure the backing strips firmly to the bearing block. In order to hold the two backing strips 20 in position before they are riveted to the bearing block 13, I connect the said backing strips at their rear ends by means of an integral cross piece 22. This cross piece 22 projects upwardly a slight distance from the backing strips and forms a stop for the rear end of the wedge, as best shown in Fig. 2.

25 represents the wedge. This wedge, in its general outlines, conforms to the standard M. C. B. type of wedge and is provided at its forward end with the usual forwardly projecting wings 26 which project over the flange 12 and the axle 10 and engage with suitable stops on the axle box so as to prevent the forward movement of the wedge. I have found, in practice, that, as the weight of the box is shifted longitudinally of the wedge, it often bends down the wings 26 so as to allow them to pass below the stops with which they are to engage, when the front end of the box is elevated, permitting the wedge to work forward out of place. In order to prevent this, I provide the wings with flanges 27 which project downwardly and rearwardly from the ends of the wings. These flanges, after projecting downwardly and rearwardly from the wings, slope inwardly, as best shown at 28 in Fig. 3, so as to form a continuation of the body of the wedge. Owing to the shape of these wings, they do not interfere with flange 12 on the axle 10 even when the bearing block is worn entirely through, and, at the same time, the wings are effectively supported so as to prevent the bending above referred to. I also connect the two wings 26 by means of a cross bar 29 at the rear of which I provide an opening 30 for the insertion of a tool to assist in the removal of the wedge from the box when said wedge is moved out of its normal position by the shifting of the weight of the box.

It will be seen that owing to the form of the bearing block, substantially all of the metal in the block is useful for wearing purposes. Owing to the form of the backing strips, a bearing surface of bearing metal is secured not only between the axle and the bearing block, but also between the bearing block and the wedge. This desirable feature is not secured in any other bearing of which I am aware, in which a hard metal backing for the bearing block is used.

Having fully described my invention, what I claim as new and desire to secure by Letters Patent of the United States is:

1. In a journal bearing, the combination with a wedge, of a bearing block having a central longitudinal rib extending substantially throughout the length of the block, and a backing member provided with an opening through which said rib projects to form a bearing surface for the wedge.

2. In a journal bearing, the combination with a wedge, of a bearing block having a lower curved and an upper flat bearing surface extending substantially throughout the length of the block, and a backing member having an opening for the passage of the flat bearing surface to form a seat for the wedge.

3. In a journal bearing, the combination with a bearing block having a central, flat bearing strip, of a pair of backing strips, one of said strips being arranged at each side of said bearing block, said backing strips having an integral cross strip connecting them at one end, said backing strips being open at the other end to allow the passage of the flat bearing strip on said bearing block.

4. In a journal bearing, the combination with a wedge, of a bearing block, a pair of backing strips, one of said strips being arranged at each side of the bearing block, said bearing being provided with a bearing surface for the wedge between said strips, and means for securing said strips to said block.

5. In a journal bearing, the combination with a bearing block, of a pair of backing strips, one of said strips being arranged at each side of the bearing block, said bearing being provided with a bearing surface for a wedge between said strips, said strips being provided with openings, said bearing block being provided with projections entering said openings.

6. In a journal bearing, the combination with a wedge, of a bearing block, a pair of backing strips, one of said strips being arranged at each side of the bearing block, said bearing being provided with a bearing surface for the wedge between said strips, said strips being provided with tapered openings, said bearing being provided with projections entering said openings and riveting the parts together.

7. In a journal bearing, the combination with a wedge, of a bearing block, a pair of backing strips, one of said strips being arranged at each side of said bearing block, said backing strips being provided with an integral cross piece connecting them at one end, said cross piece forming a stop for the inner end of the wedge.

8. The combination with a journal, of a bearing block, and a wedge, having projecting wings extending over the flange of the journal, and a supporting flange extending downwardly from the ends of said wings to a point below the plane of contact of said wedge with the bearing and sloping inwardly, to form a continuation of the body of the wedge.

9. The combination with a journal, of a bearing block, and a wedge having projecting wings extending over the flange of the journal and a supporting flange extending downwardly to a point below the plane of contact of said wedge with the bearing and also extending rearwardly from the ends of said wings and sloping inwardly to form a continuation of the body of the wedge.

10. A wedge for journal bearings, having forwardly projecting wings, an integral cross bar connecting said wings, an opening at the rear of said bar, said wedge being provided with a bearing forming a fulcrum for the under side of the tool for removing the wedge.

In testimony whereof, I have hereunto set my hand and affixed my seal in the presence of the two subscribing witnesses.

STERLING H. CAMPBELL. [L. S.]

Witnesses:
W. A. ALEXANDER,
G. M. SHORE.